United States Patent
Ryu et al.

(10) Patent No.: US 6,708,197 B1
(45) Date of Patent: Mar. 16, 2004

(54) METHOD OF DRIVING TIMER IN AN ADVANCED INTELLIGENT NETWORK SWITCHING SYSTEM EMPLOYING THE THREAD CALL STRUCTURE UNDER UNIX SYSTEM

(75) Inventors: Woong-Hee Ryu, Pusan-Kwangyokshi (KR); Kyeong-Ho Yang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 09/472,562

(22) Filed: Dec. 27, 1999

(30) Foreign Application Priority Data

Dec. 26, 1998 (KR) .............................. 98-59069

(51) Int. Cl.[7] .............................................. G06F 9/00
(52) U.S. Cl. ........................ 709/103; 709/102; 709/107; 709/100
(58) Field of Search ................................ 709/100, 102, 709/107, 103

(56) References Cited

U.S. PATENT DOCUMENTS 5,838,957 A * 11/1998 Rajaraman et al. ......... 713/502
5,982,749 A * 11/1999 Daniel et al. ................ 709/250
6,317,872 B1 * 11/2001 Gee et al. .................... 707/206

* cited by examiner

Primary Examiner—David Wiley
Assistant Examiner—Joseph E. Avellino
(74) Attorney, Agent, or Firm—Cha & Reiter, L.L.C.

(57) ABSTRACT

A method for providing an AIN (Advanced Intelligent Network) switching system employing a thread call structure with timers for threads by providing a plurality of timer items respectively for the produced threads, wherein each of the timer items includes a thread ID region for storing the identifying data of the corresponding thread, a timer ID region for storing the identifying data of the corresponding timer, a time count region for storing the count data which represents the time taken for driving the corresponding timer item of the corresponding timer, a rear pointer region for detecting the previous timer item, and a front pointer region for detecting the subsequent timer item. The structure further providing a head item for starting a timer drive process every second, wherein the head item includes a head region for storing the head information and a front pointer region for indicating the timer item having the shortest count data.

3 Claims, 8 Drawing Sheets

INITIAL TIMER TABLE

| THREAD ID | TIMER ID | TIMER COUNT |
|---|---|---|
| NULL | NULL | NULL |
| NULL | NULL | NULL |
| NULL | NULL | NULL |
| NULL | NULL | NULL |
| NULL | NULL | NULL |
| NULL | NULL | NULL |
| ⋮ | ⋮ | ⋮ |
| NULL | NULL | NULL |

10 — THREAD ID
11 — TIMER ID
12 — TIMER COUNT

First row: POINTER TO INSERT TIMER

NUMBER OF PRODUCIBLE THREADS (FIXED VALUE)

FIG. 1a [prior Art]

TABLE WITH THREE TIMERS DRIVEN

| THREAD ID | TIMER ID | TIMER COUNT |
|---|---|---|
| THREAD ID 1 | TIMER ID 1 | COUNT 1 |
| THREAD ID 2 | TIMER ID 2 | COUNT 2 |
| THREAD ID 3 | TIMER ID 3 | COUNT 3 |
| NULL | NULL | NULL | ← POINTER TO INSERT TIMER
| NULL | NULL | NULL |
| NULL | NULL | NULL |
| ⋮ | ⋮ | ⋮ |
| NULL | NULL | NULL |

NUMBER OF PRODUCIBLE THREADS (FIXED VALUE)

FIG.1b [Prior Art]

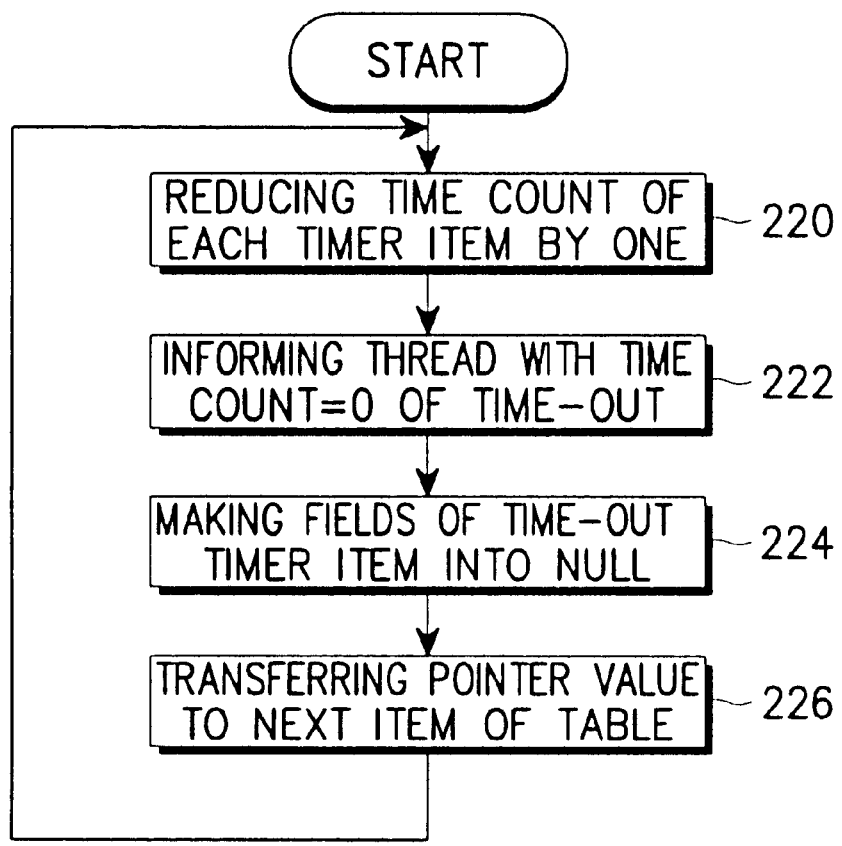
FIG.2b [Prior Art]

METHOD OF ADDING TIMER ITEM

METHOD OF DRIVING TIMER IN AN ADVANCED INTELLIGENT NETWORK SWITCHING SYSTEM EMPLOYING THE THREAD CALL STRUCTURE UNDER UNIX SYSTEM

CLAIM OF PRIORITY

This application makes reference to, incorporates the same herein, and claims all benefits accruing under 35 U.S.C. Section 119 from an application METHOD OF DRIVING TIMER IN AN ADVANCED INTELLIGENT NETWORK SWITCHING SYSTEM EMPLOYING THE THREAD CALL STRUCTURE UNDER UNIX SYSTEM earlier filed in the Korean Industrial Property Office on the Dec. 26, 1998 and there duly assigned Serial No. 59069/1998.

BACKGROUND OF THE INVENTION

1. Field of the Invention

The present invention relates to a method of driving a timer when processing a call in an advanced intelligent network (AIN) switching system employing the thread call structure services according to the UNIX system.

2. Description of the Related Art

A conventional switching system is driven by an individual operating system (OS) to process a call processing application. However, the AIN switching system recommended by ITU-T Q.1200 Series is driven by a commercial operating system known as UNIX system to process a call by performing call processing according to the service switching module (SSM), service control module (SCM), and intelligent peripheral (EP). The AIN system is more advantageous in reducing time for developing an application service and cost, as well as in enhancing reliability. When the AIN switching system processes calls, the process for each call requires a different timer at various stages from the beginning to the ending of the call process. For example, when a call is requested, there is a waiting period for the switching system to pause for the first digit of the phone number that is being dialed, and another waiting period for exchanging signals between the systems. For the conventional AIN switching system which provides a separate timer for each task of performing the call processing, the timer allocated to each processing timer is provided with a predetermined count value to complete the call process.

However, the conventional AIN switching system employing the thread structure according to the UNIX system requires thread services in order to process a call. That is, UNIX uses thread services to execute a given process, and all the produced threads are provided with their own timer. Since each thread requires its own timer for allowing the operation at different times, a timer drive structure is provided to manage all the thread services. To this end, a table is provided to include a number of items corresponding to each respectively produced threads. Each timer item includes three fields for storing a thread ID (identification), timer ID, and timer count, respectively. The table is sequentially scanned every second so as to decrease the timer count for each timer item, one by one. Thus, when the time count becomes "0", the thread is time-out, or that particular thread is removed.

For example, FIG. 1A schematically represents the initial timer table that includes a number of fields arranged in rows and columns for storing the thread ID 10, the timer ID 11, and the timer counter 12. In this case, as the table shows the initial state of the timer, all the items are initially in null state (NULL), and the pointer-to-insert the timer directs to the first thread field of the table. FIG. 1B illustrates the timer table when three timers are driven, and the pointer-to-insert the timer point is pointed to the fourth thread row. However, this timer drive structure—as shown in FIGS. 1A and 1B—requires a large memory to accommodate all the timer items corresponding to the threads, as well as consuming too much time for sequentially scanning each thread item for detecting the time-out state.

FIG. 2A depicts a flow chart illustrating the method for adding a timer in a conventional timer drive structure. Initially, the thread items of the timer table are sequentially scanned in step 210 to search for the thread item in NULL state in step 212, and then a thread ID and timer count are inserted into their respective fields of the thread item in NULL state in step 214. Lastly, in step 216, the corresponding timer ID is allotted to the thread item. However, in this case, too much time is consumed for sequential scanning for each thread item in NULL state.

FIG. 2B depicts a flow chart illustrating the method for deleting the timer in the time-out state. First, the thread items of the timer table is sequentially scanned to decrease their respective timer counts by one every second in step 220. Upon detecting the thread ID having a zero count, the corresponding thread item is reported as being in the time-out state, in step 222. Thereafter, the respective fields of the time-out thread item are changed into NULL state in step 224, and the pointer is transferred to the next item in step 226. Again, too much time is consumed for scanning each item in the table in sequence to delete the timer with the time-out state. Thus, the thread structure of the conventional AIN switching system requires a large memory to accommodate the useless thread items waiting to be deleted in the table as well as increasing the processing time for sequentially searching for all the thread items as the number of thread items increases. There are additional problems such as directing the pointer to a new timer and treating the field from which the timer was deleted.

The operation of the conventional AIN switching system, which uses an individual process produced for each call to perform call processing, is explained herein. When a subscriber picks up the handset of a telephone, the hardware switching system detects the off-the-hook condition and produces an event message which is transferred to the switching message handler, which then transfers the event message to the call processing module to generate a UNIX process for the call request message. In this case, the half call concept is used to process the call in the interprocess communication (IPC) between two separate processes that are applied to the originating part and terminating part, respectively. However, according to such system, since the number of processes increases with the number of calls, each process occupying a portion of the CPU time to execute its routine according to the time scheduling of the UNIX system also increases. As the UNIX system must produce a process for each call and perform the context switching from one process to the next process, the speed of processing a call decreases rapidly with the number of calls. Thus, the speed of producing a process for a new call to establish an actual connection is delayed even further. Moreover, producing the process for the UNIX system call requires a relatively large portion of the system resource, such as memory region, stack region, CPU register, and other regions. Consequently, all these increased demands influence the amount of the data that is switched during the context switching between the processes so as to reduce the capacity of the AIN switching system. In order to resolve these problems involving a reduction of the processing capacity and speed, a conventional AIN switching system has been proposed which employs a thread call structure according to the UNIX system.

The thread call structure employing the thread call structure causes the process produced by the UNIX system to produce another thread to perform the call processing, instead of having the process directing the call processing. The process produces the corresponding thread to perform the call processing. Essentially, the thread becomes the user level entity produced by the process to allow a direct access through a given library, as compared to the process which is the kernel level entity produced by the UNIX system. Here, the library is usually called the thread library. As the process produces another thread/process and uses all the codes and data of the former through the thread library, the timer scheduler does not need the CPU time in relation with processing the code and the data. Hence, if a thread is switched to another thread after processing its codes and data, the amount of the data switched is considerably reduced as compared to the previously known structure. Thus, the thread call structure produces a thread to perform call processing using the thread library provided by the UNIX system, so that the time taken for producing the thread is much less than the time taken for producing the process by the UNIX system call.

Moreover, the portion of the system resource used to manage the thread is considerably less than that of the process, thus reducing the context switching between the threads, increasing the call processing speed as compared to the former process structure, and increasing the number of calls processed by the switching system. In summary, the thread call structure helps to resolve the problem associated with the number of calls which lowers the performance of the switching system, including the call processing speed due to the excessive use of the system resource and the requirement for having a large memory capacity.

Meanwhile, in the above stated conventional AIN switching system employing the thread call structure, each thread commonly occupies a single timer allotted to the corresponding process that produces them. In order for each thread to have a separate timer to perform its own operation at different times, there has been a proposed timer drive structure having a thread table, and having a number of timer items corresponding to each thread. However, such time driver structure still requires sequentially scanning each item in the table, thereby increases the searching time.

SUMMARY OF THE INVENTION

It is an object of the present invention to provide an AIN switching system with a thread call structure which is based on a timer item concept to obviate the unnecessary sequential scanning of the thread table.

It is another object of the present invention to provide a method for driving a thread timer in an AIN switching system with a thread call structure which allows a call to be quickly processed without requiring a large memory capacity.

It is still another object of the present invention to provide a method of providing, adding, and deleting timers for processing thread calls as needed, without fixing the number of the timers according to the number of the threads to be produced as in the conventional AIN switching system with a thread call structure.

The inventive concept is based on the double linked list data structure to drive a separate timer for each thread when processing calls in an AIN switching system with a thread call structure. This reduces the amount of the memory necessary for driving the timers as well as the time taken for searching them.

According to one aspect of the present invention, a method for providing an AIN (Advanced Intelligent Network) switching system employing a thread call structure with timers for each produced thread, the method comprises the steps of providing timer items respectively for each produced thread, wherein each of the timer items consisting of a thread ID region for storing the identifying data of the corresponding thread, a timer ID region for storing the identifying data of the corresponding timer, a time count region for storing the count data of corresponding timer, a rear pointer region for detecting the previous timer item, and a front pointer region for detecting the subsequent timer item, the count data being the time taken for driving the corresponding timer item; providing a head item for starting a timer drive process called per second, wherein the head item consisting of a head region for storing the head information and a front pointer region for indicating the timer item having the shortest count data; providing the timer items be arranged in the order of short to long count data with the head item being the first so as to form the double linked list structure; executing the timer drive process to sequentially reduce the count data of each timer item one by one until detecting the timer item whose count data equals to zero indicating the time-out state; informing the corresponding thread of the time-out and deleting the corresponding timer item; and, terminating the scanning of the timer list upon detecting the timer item whose front pointer is in null state.

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention. dr

A BRIEF DESCRIPTION OF THE ATTACHED DRAWINGS

FIGS. 1A and 1B illustrate the timer drive table in a conventional AIN switching system employing the thread call structure according to the UNIX system;

FIGS. 2A and 2B are flow charts for illustrating the process of driving timers in a conventional AIN switching system employing the thread call structure according to the UNIX system;

Figure 4:
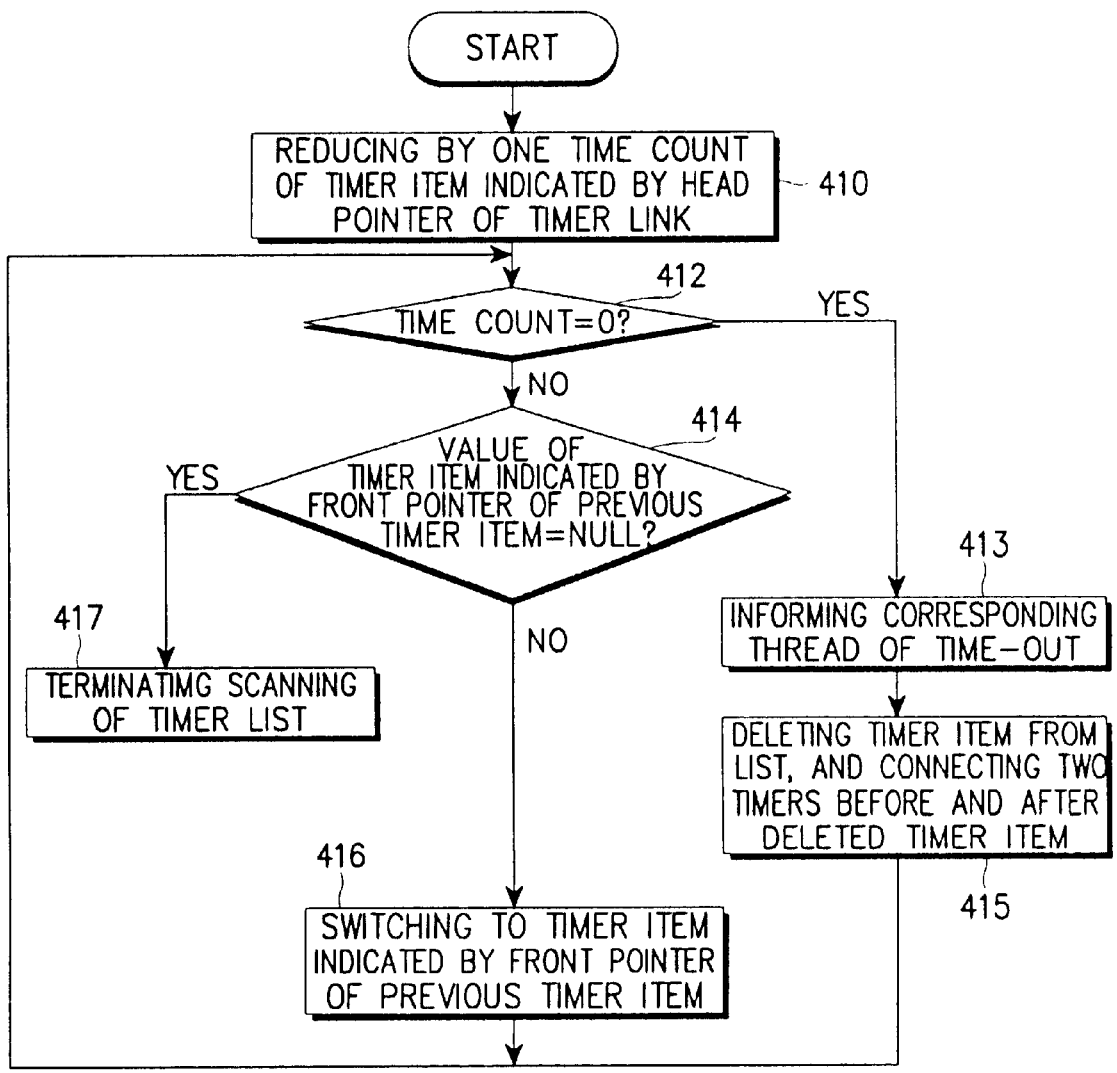
Figure 5A:
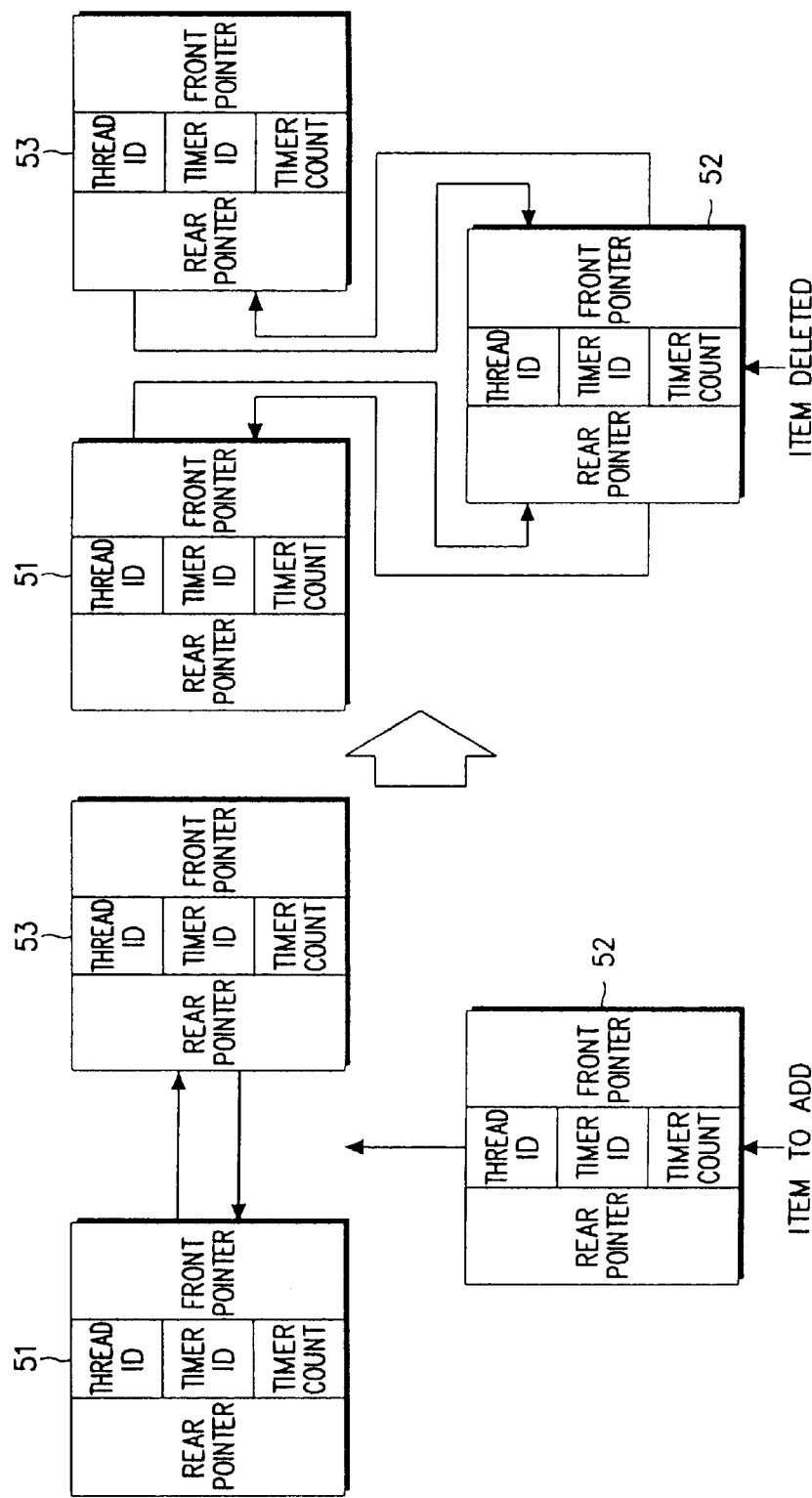
Figure 5B:
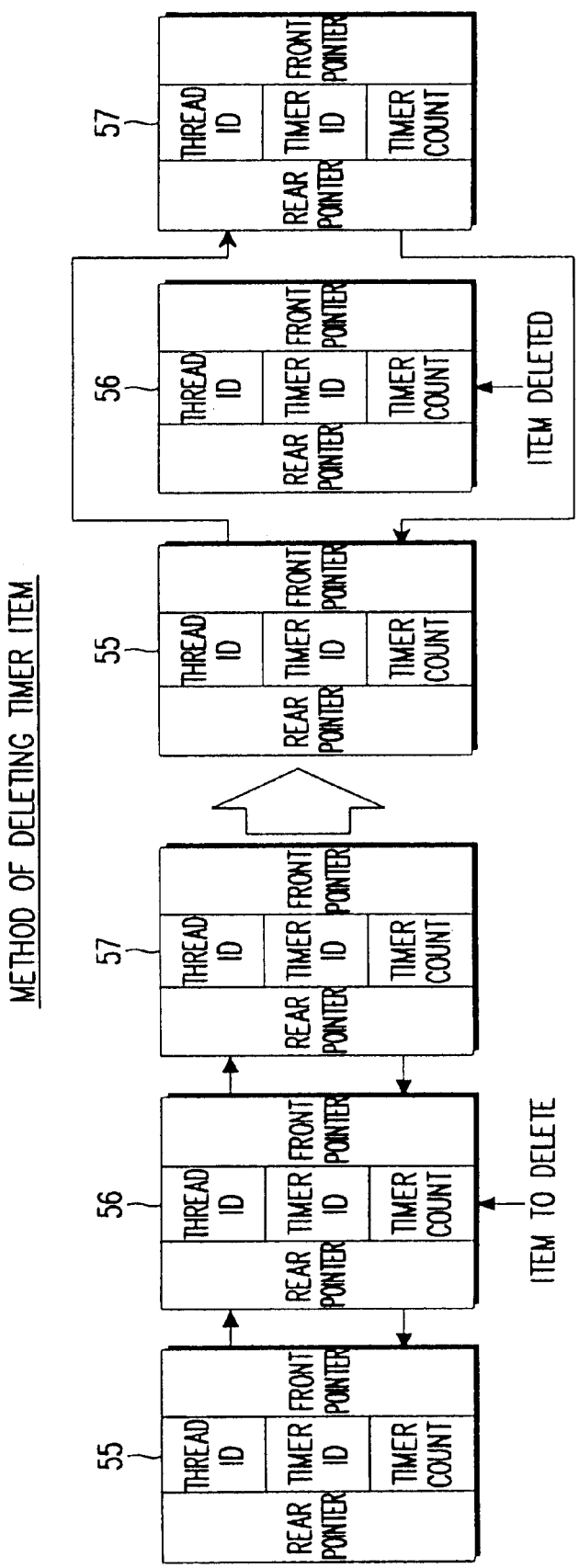

FIG. 4 is a flow chart for illustrating the process of driving the timers in accordance with the present invention employing the thread call structure according to the UNIX system; and, FIG. 5A is a block diagram for illustrating the adding of a timer to an inventive AIN switching system employing the thread call structure under the UNIX system; and, FIG. 5B is a block diagram for illustrating the deletion of a timer in accordance with the present invention employing the thread call structure under the UNIX system.

A DETAILED DESCRIPTION OF THE PREFERRED EMBODIMENT

In the following description, for purposes of explanation rather than limitation, specific details are set forth such as particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 2A:
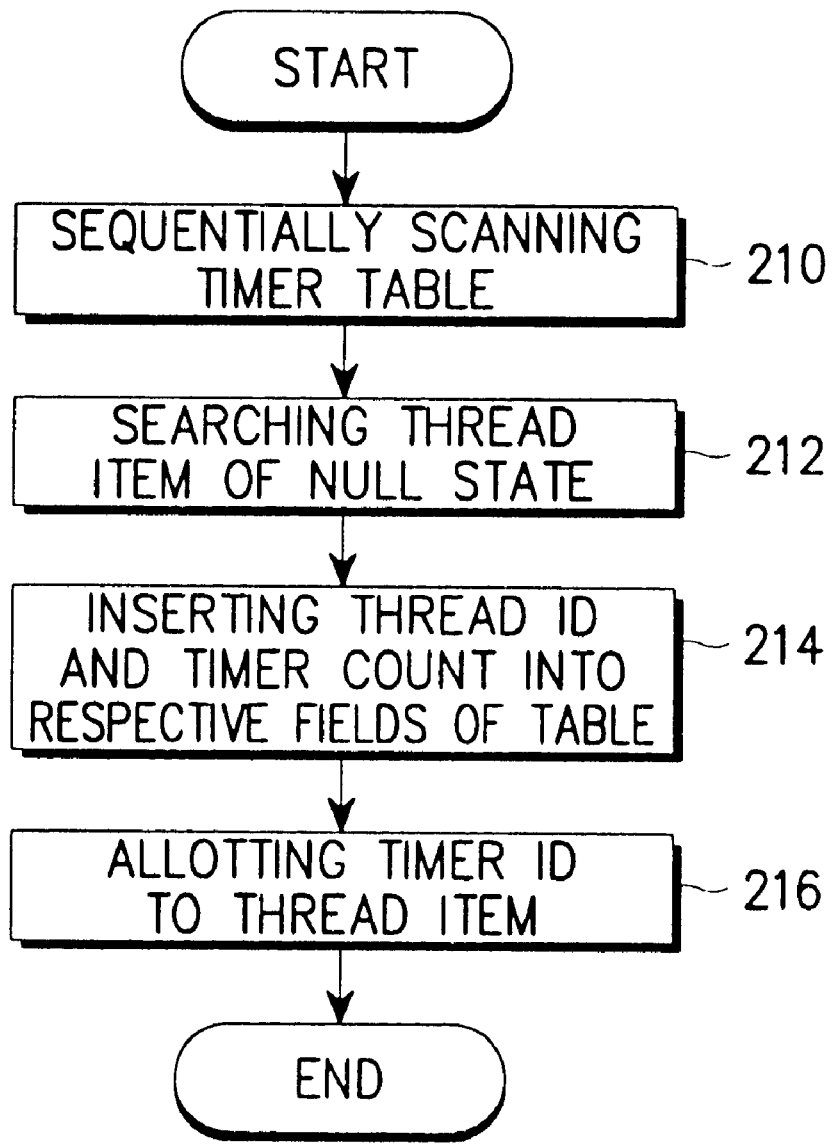
Figure 3:
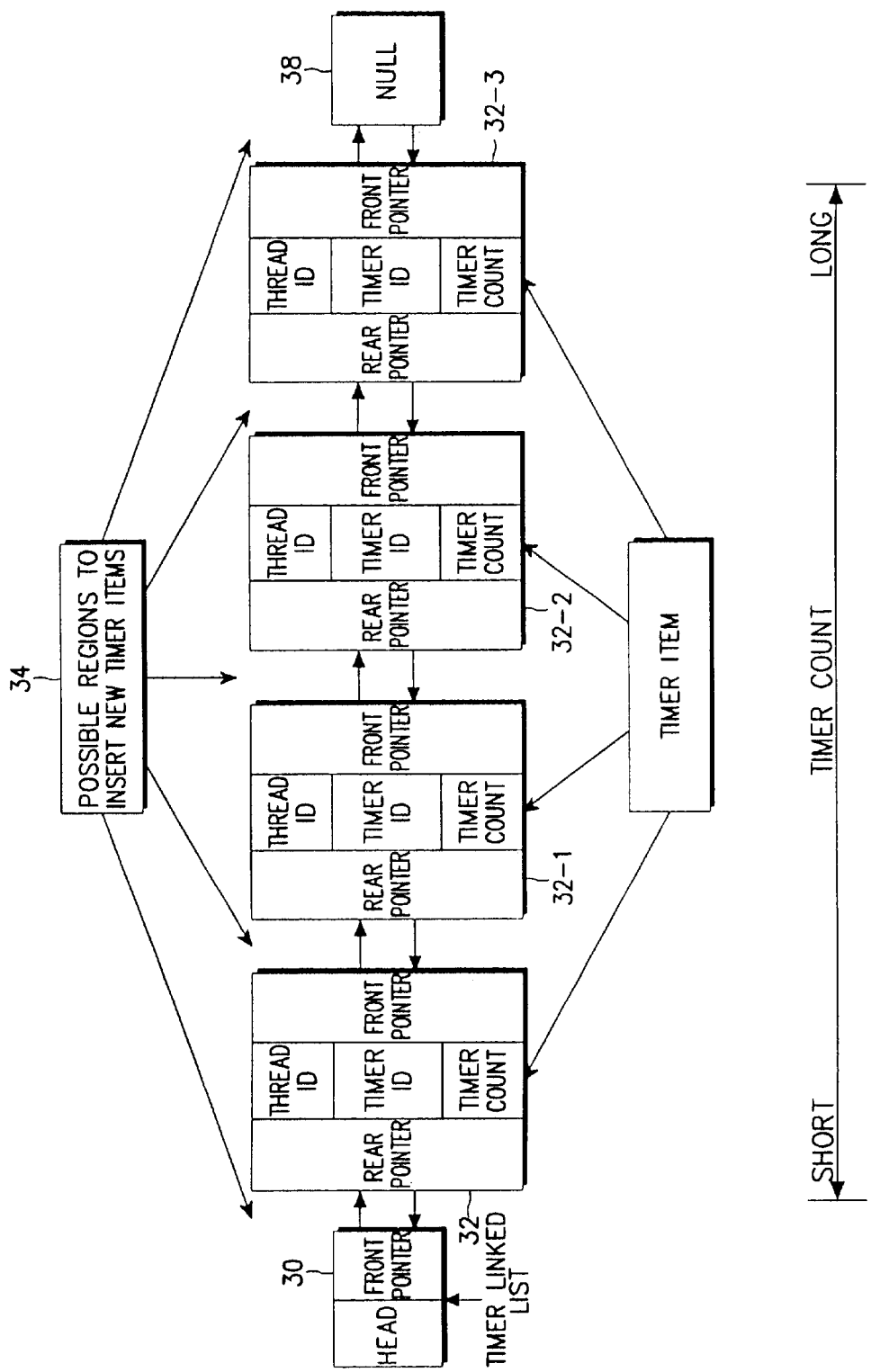
FIG. 3 is a block diagram for illustrating the arrangement of the timers in accordance with the present invention employing the thread call structure according to the UNIX system.

In FIG. 3, the AIN switching system according to the present invention, includes a plurality of timer items arranged in the form of a double linked list structure. Each of the timer items 32 corresponding to a thread is provided with a thread ID region for storing the identifying data of the corresponding thread, a timer ID region for storing the identifying data of a corresponding timer, a time count region for storing the count data of the corresponding timer, a rear pointer region for detecting a previous timer item, and a front pointer region for detecting a subsequent timer item. The rear and front pointer regions are used to store the information used for connecting two adjacent timer items in the double linked list structure. In addition to the timer items 32, a head item 30 is provided for starting a timer drive process every second. Also, a null item 38 is arranged in the final stage of the double linked list structure to represent an ending of the timer corresponding to a thread. The head item includes a head region for storing the head information, and a front pointer region for indicating the timer item having the shortest count data. The count data represents the time it takes to drive the corresponding timer item.

The timer items 32 are arranged from the shortest to the longest count data and provided with the head item 30, leading all the timer items to form the double linked list structure. Hence, the timer item positioned from the farthest from the header region has the longest time count. A null item is positioned at the end of the timer items at the opposite end of the head item. Hence, as shown in FIG. 3, the timer driver detects the timer items from the shortest to the longest timer count, and this process is repeated by the head item 30 to sequentially reduce the timer count of each timer item, one by one, until the front point encounters the null item 38. The above operation in accordance with the double linked list structure is discussed in books and materials published concerning UNIX.

FIG. 4 illustrates the process for driving the timers. First, the time count for each timer item indicated by the head pointer is reduced by one time count in step 410. Then, if the time count with 0 value is detected in step 412 indicating a time-out state, the thread with the time-out state is informed of such state, in step 413. The timer item having the time-out state is deleted from the double linked list structure in step 415 so that the two newly adjacent items arranged before and after the deleted timer item are coupled to each other through their respective front and rear pointers.

However, if the time-out state is not detected in step 412, it is determined in step 414 whether the front pointer of the timer item detects the next timer item whose pointer value indicates the null item. Namely, it is determined whether the front pointer of a timer item encounters a subsequent timer item whose value represents the null state after subsequently reducing the time count of each timer item by one. If so, the scanning operation of the timer list is terminated in step 417. This means either that it is no longer necessary to scan for the timer item with the null state, or that all the threads that have been produced are completely scanned. Alternatively, if the front pointer of the timer item detected, in step 414, does not encounter the subsequent timer item whose pointer value is null, the process is switched to the next adjacent timer item indicated by the front pointer of the previous timer item in step 416, and thereafter the whole process starting from step 410 is repeated.

In summarizing the process of operating the timers, as shown in FIG. 4, a plurality of timer items is provided for each of the produced threads in the double linked list structure. During the scanning operation of the timer list, if the timer item whose time count has been terminated is detected, the time-out state of the thread is reported and deleted so that the remaining timer items are rearranged from the shortest to the longest time count according to the double linked list structure, and the scanning operation is resumed. Upon detection of the null timer item, the scanning operation of the list is finally terminated.

FIG. 5A illustrates the operation of adding a timer item in the double linked list structure, as shown in FIG. 3 and FIG. 5B illustrates the operation of deleting a timer item in the double linked list structure, as shown in FIG. 3. In FIG. 5A, if a timer item 52 is generated and its time count has a value between two adjacent timer items 51 and 53, the timer item 52 is inserted between them in the double linked list structure. Namely, the front and rear pointers of the inserted timer item 52 are double-linked respectively with the rear pointer of the timer item 53 and the front pointer of the timer item 51.

On the contrary, if the time count of a timer item 56 has become zero in the double linked list structure between two timer items 55 and 57, it is deleted from the linked list, as shown in FIG. 5b, so that the adjacent timer items 55 and 57 are rearranged and coupled to each other in the double linked list structure.

As is apparent from the foregoing, the present invention is advantageous because a newly generated timer item can be properly inserted into the double linked list structure while maintaining the time count order from the shortest to the longest time count, or it can be deleted whenever it reaches a time-out state. Thus, it unnecessary to keep the threads that have become obsolete as in the conventional table, nor to sequentially detect all the items of the table every time the scanning operation is performed, thereby considerably reducing the detection time. This is preferably achieved by applying the concept of the double linked list structure to the call processing of the AIN switching system according to the UNIX system.

While the embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation to the teaching of the present invention without departing from the central scope thereof. Therefore, it is intended that the present invention not be limited to the particular embodiment disclosed as the best mode contemplated for carrying out the present invention, but that the present invention includes all embodiments that fall within the scope of the appended claims.

What is claimed is:

1. A method for providing an AIN (Advanced Intelligent Network) switching system employing a thread call structure having a plurality of timers variably corresponding to a plurality of produced threads, said method comprising the steps of:

providing a plurality of timer items having a variable correspondence to said plurality of produced threads as needed, without fixing a number of the plurality of timers according to a number of the plurality of threads;

providing a head item in front of said plurality of timer items and a null item at the end of said plurality of timer items in the opposite end of said head item to engage a timer drive process every second, said head item includes a pointer which points to a timer item having a shortest count data;

arranging said plurality of timer items having a shortest count data to a longest count data in sequence to form a double linked list structure;

sequentially reducing the count data of each said timer item in sequence and simultaneously detecting a time-out state of said timer item;

informing said produced thread corresponding to said timer item with said time-out state;

deleting said produced thread with said time-out state from the double linked structure sequence and coupling together adjacent threads that were connected at opposite ends of said produced thread prior to deletion so as to maintain said double linked structure;

terminating the step of sequentially reducing the count data of each timer item in said timer list upon detecting said null timer item.

2. The method as set forth in claim 1, said method further comprising the step of adding a newly produced thread between said plurality of said timer items so that the integrity of said shortest count data to longest count data in sequence is not disturbed.

3. The method as set forth in claim 1, wherein each of said timer items providing a thread ID region for storing an identifying data corresponding to said produced thread, a timer region for storing an identifying data corresponding to said timer item, a time count region for storing the count data corresponding to said timer item, a rear pointer region for detecting a previous timer item, and a front pointer region for detecting a subsequent timer item, wherein said count data represents a duration of period for driving said timer item.

* * * * *